(12) United States Patent
Lee

(10) Patent No.: US 6,400,669 B1
(45) Date of Patent: Jun. 4, 2002

(54) RECORDING MEDIUM EJECTING APPARATUS FOR OPTICAL DISC DRIVE

(75) Inventor: Han Baek Lee, Pyungtaek (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/418,575

(22) Filed: Oct. 15, 1999

(30) Foreign Application Priority Data

Oct. 15, 1998 (KR) .............................................. 98-43118

(51) Int. Cl.$^7$ .............................................. G11B 33/02
(52) U.S. Cl. .................................................. 369/77.1
(58) Field of Search .............................. 369/75.1–75.2, 369/77.1–77.2; 360/99.06, 99.02

(56) References Cited

U.S. PATENT DOCUMENTS 5,768,239 A * 6/1998 Sellers ....................... 369/75.2
5,883,870 A * 3/1999 Akiba et al. ................ 369/75.2
6,111,838 A * 8/2000 Akiba ......................... 369/77.1

FOREIGN PATENT DOCUMENTS

JP          6338114          12/1994

* cited by examiner

Primary Examiner—Allen Cao

(57) ABSTRACT

A recording medium ejecting apparatus including a drive main body, a tray carrying a recording medium and being movable inwardly and outwardly of the drive main body; and a driving element for supplying power for the movement of the tray, even in a state where it is completely ejected from the drive main body, wherein the tray can be inserted and ejected to the position where the disk can be loaded and unloaded by using electric power in a thin and small tray-type disk drive as used for a notebook computer, enabling user's convenience.

11 Claims, 14 Drawing Sheets

RECORDING MEDIUM EJECTING APPARATUS FOR OPTICAL DISC DRIVE

BACKGROUND OF THE INVENTION

1. Field of the Invention

The present invention relates to a recording medium ejecting apparatus, and more particularly to a recording medium ejecting apparatus by which a tray usually inserted inwardly and ejected outwardly from a drive is sufficiently ejected by means of electric power to a position where a disk can be inserted or removed in a tray-loading type optical disk drive typically used in a notebook computer.

2. Description of the Conventional Art

A conventional tray-loading type optical disk drive 20 using a disk as a recording medium includes, as shown in FIGS. 1 and 2, a lower chassis 1 and an upper chassis 2 which are joined together to form an outer casing, and a disk is driven between the lower chassis 1 and the upper chassis 2.

The conventional optical disk drive is constructed such that a tray 6 is slidably installed at an upper portion of the lower chassis 1 so as to be movable inwardly and outwardly to and from the drive 20.

A turntable 7 upon which a disk D may be mounted is installed in the tray 6. A damper 8 for preventing the disk K from dismounting during rotation after being inserted on the turntable 7 is installed at an upper surface of the turntable 7.

At one side of the turntable 7, there is provided an optical pick-up 9 for recording and reproducing signals onto and from the disk D, and a lead screw (not shown) being rotated by a sled motor (not shown) is installed to move the optical pick-up 9 in a radial direction of the disk D.

For convenience's sake, regarding explanations on the formation of the lower chassis 1 and the upper chassis 2, and other elements combined thereto, hereinafter the direction in which the tray 6 is ejected from the drive 20 is referred to as the forward direction, while its opposite direction is referred to as the backward direction.

A driving plate 10 operable by the lead screw is installed at a lower surface of the front side of the tray 6.

An eject lever 11 is installed to be operable according to the operation of the driving plate 10.

In explanations hereinafter, of the both sides of the lower chassis 1 and the tray 6, the opposite side to the side where the eject level 11 is positioned is referred to as the one side, while the side where the eject level 11 is positioned is referred to as the other side.

The eject lever 11 is rotatably installed centering around a hinge shaft 11h connected to a lower surface of the tray 6, and a protrusion 11s is provided at a rear side of the hinge shaft 11h. The protrusion 11s is engaged in an engaging portion 5 formed in the lower chassis 1 to thereby control the rotation of the eject lever 11.

A spring 14 is installed at a predetermined portion of a lower surface of the tray 6 so that the tray 6 may have an elasticity in the forward direction when the tray 6 is completely inserted into the drive 20.

An elastic support guide 13 is installed at an upper surface of the tray positioned outwardly of the spring 14, so that the elastic support guide 13 is elastically and selectively supported by the spring 14 as being combined thereto. The guide 13 is selectively contacted with an elastic support plate 4 installed at an upper surface of the upper chassis 2.

That is, when the tray 6 is positioned inside the drive 20, as the elastic support guide 13 is contacted with the elastic support plate 4 and is moved backwardly, the spring 14 is put in a tensioned state.

Meanwhile, as shown in FIG. 4, sliding legs 6s and 6s' for guiding the tray 6 when it moves forward and backward to and from the drive 20 are formed along the entire length of both side edges of the tray 6.

The sliding legs 6s and 6s' are respectively inserted into guide rails 3 and 3' that are installed along the entire length of both sides of the tray, and guide the movement of the tray 6 as they move along the guide rails 3 and 3'.

Support rails 3s and 3s' for supporting the sliding legs 6s and 6s' are installed between the guide rails 3 and 3' and the sliding legs 6s and 6s' so that the tray 6 can be extracted outwardly of the guide rails 3 and 3'.

The operation of the tray 6 for loading and unloading the disk D in the conventional disk drive constructed as described above will now be explained, largely focussing on the ejection of the tray 6 from the drive 20.

When an eject button 12 combined with the other side of the front side of the tray 6 is pressed by a user, the optical pick-up moves to one side of the outer periphery of the disk D.

At the instant when the movement of the optical pick-up 9 toward the outer periphery of the disk D occurs, an overstroke occurs at the lead screw which moves the optical pick-up 9, and the driving plate 10 is moved forwardly by the overstroke.

According to such movement of the driving plate 10, the eject lever 11 is rotated counterclockwise centering around the hinge shaft 11h, and then the engaging portion 11s is released from the engagement with the protrusion 5.

With such operation, when the tray is released from the lower chassis 1, as shown in FIG. 3, it is a bit (as long as a distance movement produced by the elasticity of the spring 14) protruded forwardly from the drive 20 due to the elasticity of the spring 14. At this time, since the tray 6 is not sufficiently ejected outwardly to the position where the recording medium can be inserted or removed, the tray needs to be manually taken out from the drive 20 by the user to the position shown in FIG. 4 where the disk D can be inserted to or removed from the turntable 7.

Then, after the disk D is inserted to or removed from the turntable 7, the tray 6 needs to be manually pushed back into the drive 20 by the user.

By pushing the tray 6 into the drive 20 completely, the engaging portion 11s of the eject lever 11 is again engaged with the protrusion 5, and then the tray 6 is fixed inside the lower chassis 1.

Of course, as the tray 6 moves inwardly of the drive 20, the elastic support guide 13 is moved backwardly by the elastic support piece 4, rendering the spring 14 to be in a tensioned state.

Accordingly, when the spring 14 is in the tensioned state, the tray 6 is urged to be moved outward from the drive 20 by the spring 14, nevertheless, the tray 6 won't move outwardly because the engaging portion 11S is engaged with the protrusion 5.

Reference numeral 39 denotes an insertion detection protrusion.

However, the conventional optical disk drive as described above is disadvantageous in that most operations of the tray for loading and unloading of the disk are manually done, causing users's inconveniences.

In detail, when the eject button is pressed, since the tray is not sufficiently ejected for the user to insert the disk onto the turntable or to remove the inserted disk therefrom, the user must use his or her hands directly to pull out the tray.

In addition, after the disk is inserted or removed, the user must again use his or her hands to push the tray into the drive for complete insertion.

SUMMARY OF THE INVENTION

Accordingly, an object of the present invention is to provide a recording medium ejecting apparatus by which a loading tray can be automatically moved for loading and unloading of a disk with respect to a thin and small optical disk drive.

To achieve these and other advantages and in accordance with the purposes of the present invention, as embodied and broadly described herein, there is provided a recording medium ejecting apparatus including a drive main body, a tray for carrying a recording medium and being movable outwardly and inwardly of the drive main body, and a driving unit for movement of the tray, and also for movement of the tray even in a state that the tray is completely ejected from the drive main body.

There is also provided a recording medium ejecting apparatus which includes a driving unit for supplying a driving power for ejecting a tray, being positioned within a range corresponding to a radius of a recording medium taken at an opposite direction of ejection over a diameter of the recording medium orthogonal to an ejection direction of the tray.

Additionally, there is provided a recording medium ejecting apparatus including a driving unit for supplying a driving force enabling a tray to be inserted from a completely ejected state from a drive main body, being positioned between the drive main body and the tray.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figures 1, 2:
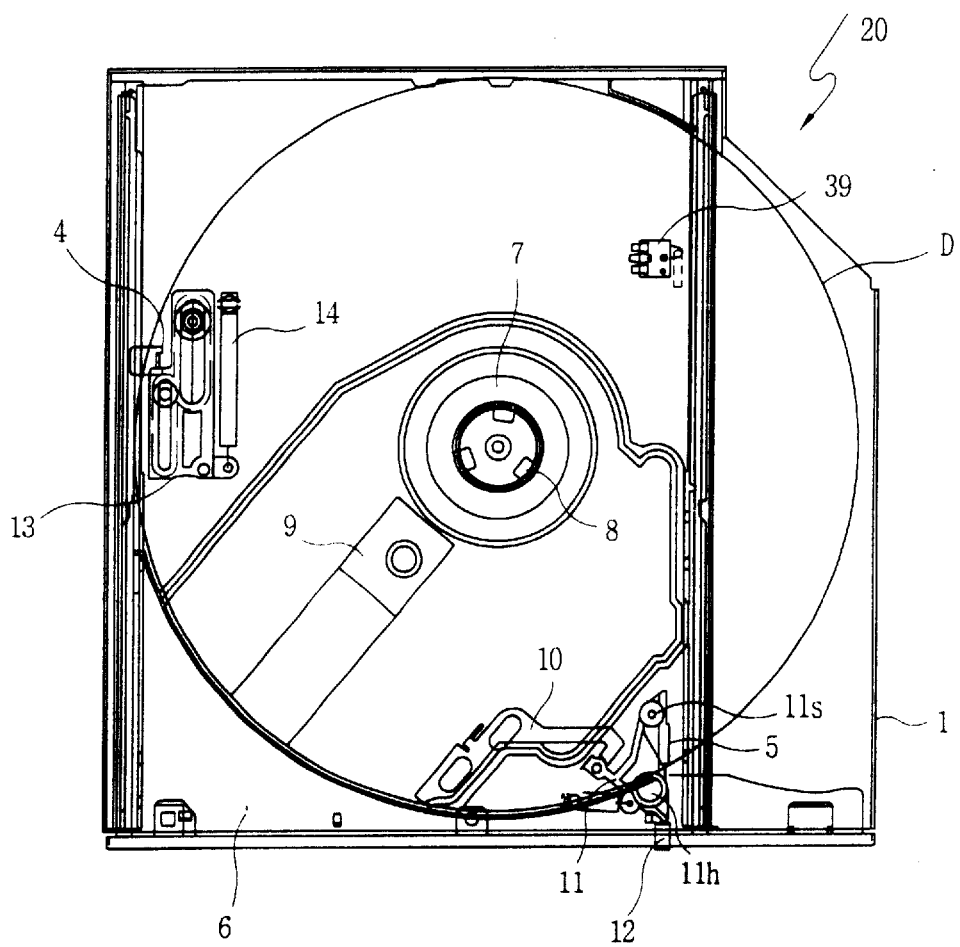
FIG. 1 is a plan view of a conventional recording medium ejecting apparatus.
FIG. 2 is a front sectional view of the conventional recording medium ejecting apparatus.
Figure 3:
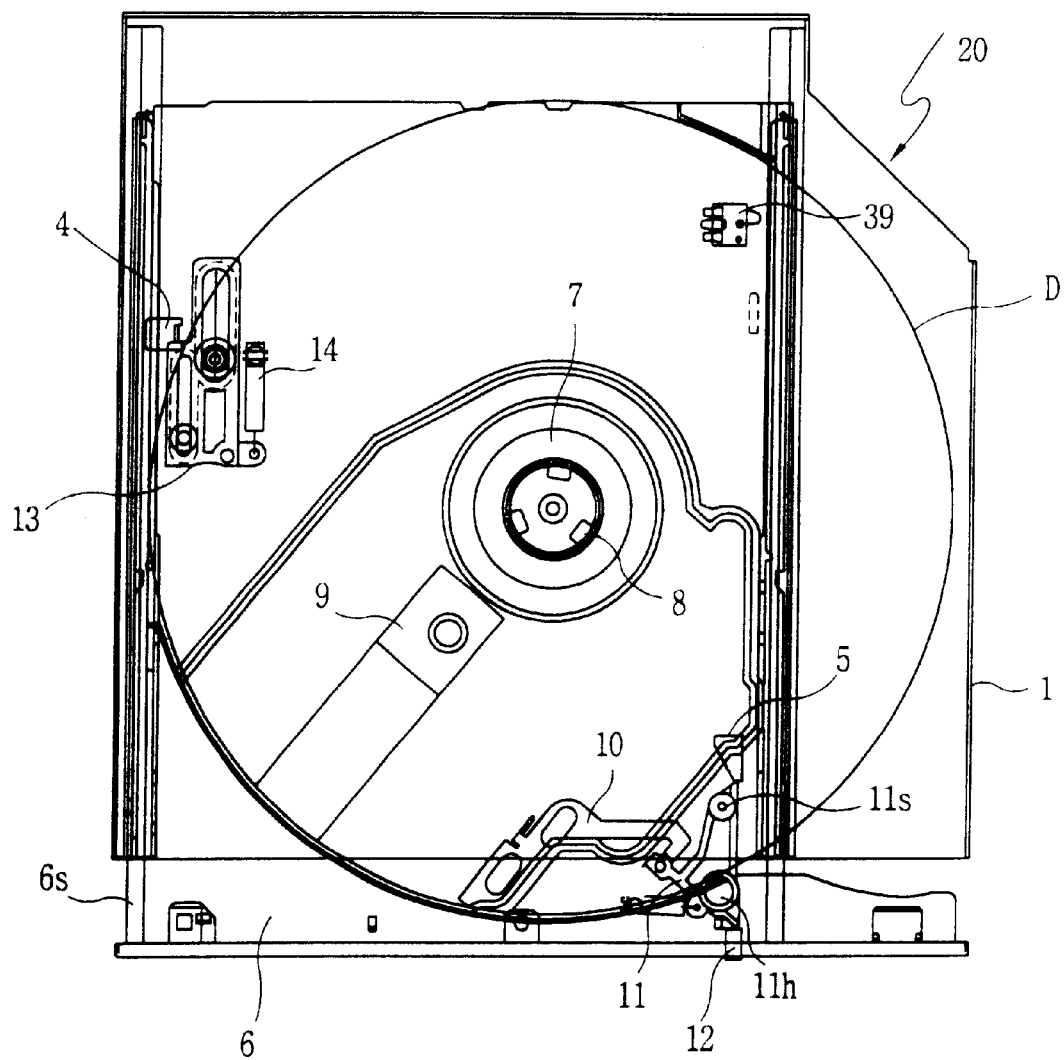
FIG. 3 is a plan view showing a state that a tray is ejected by an elasticity of a spring in the conventional recording medium ejecting apparatus.
Figure 4:
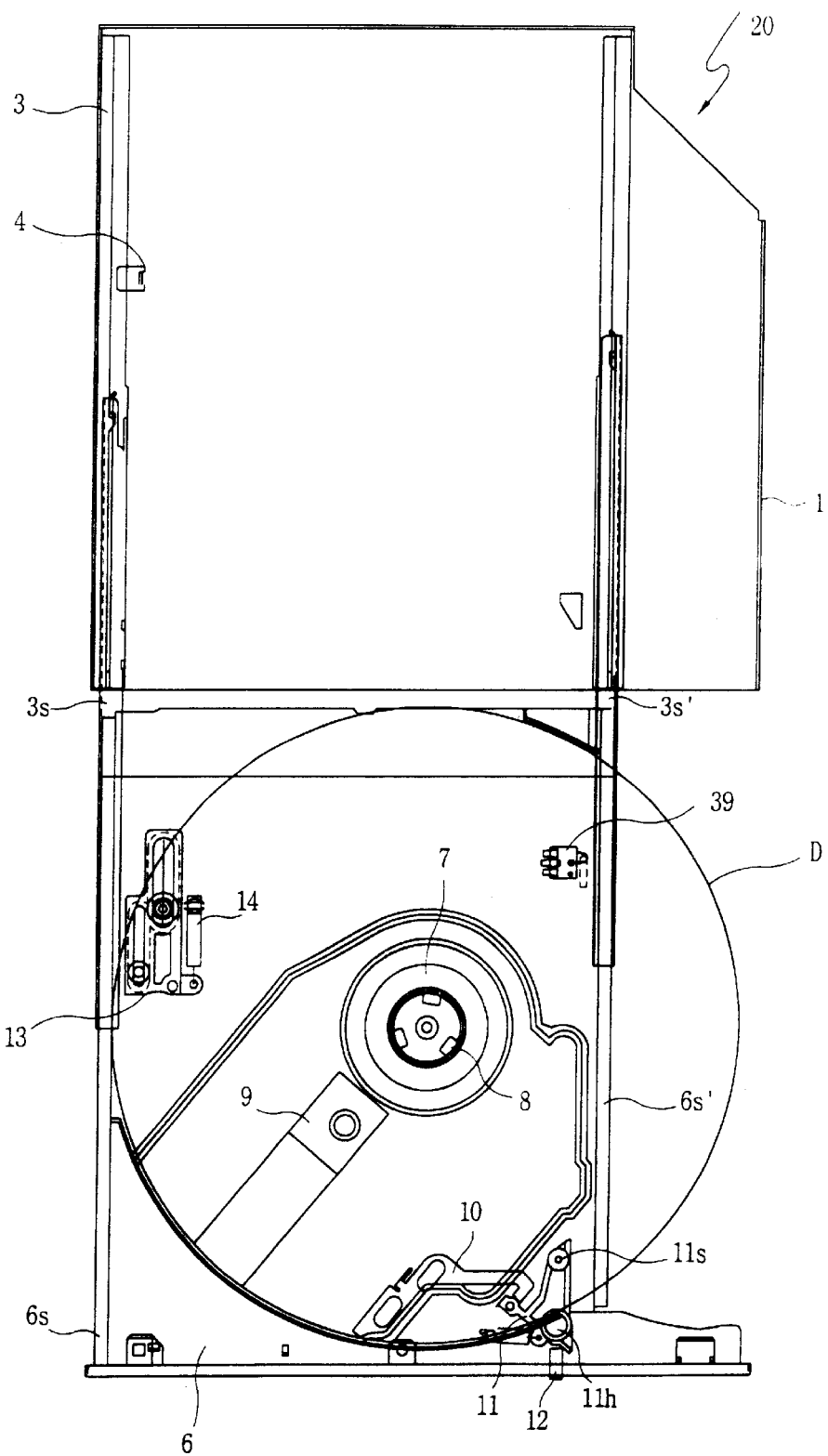
FIG. 4 is a plan showing a state that the tray is completely extracted outwardly in the conventional recording medium ejecting apparatus.
Figure 5:
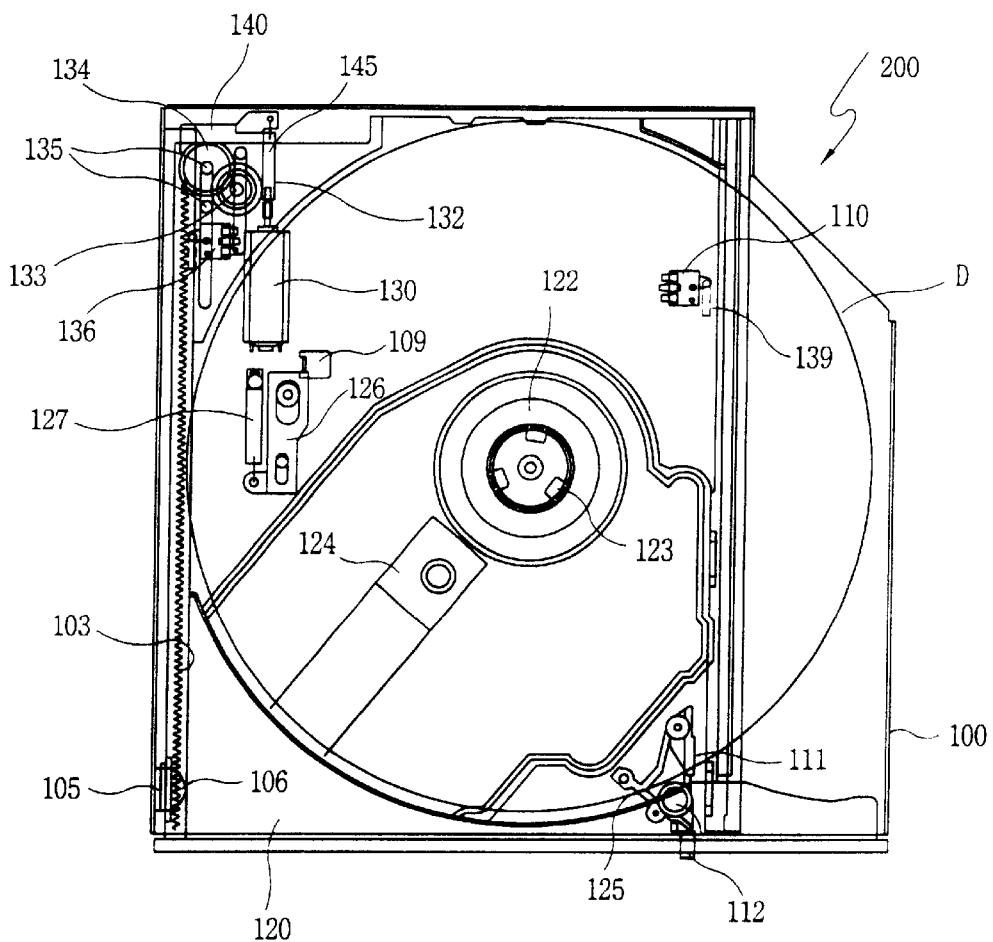
FIG. 5 is a plan view of a recording medium ejecting apparatus in accordance with the present invention.
Figure 6:
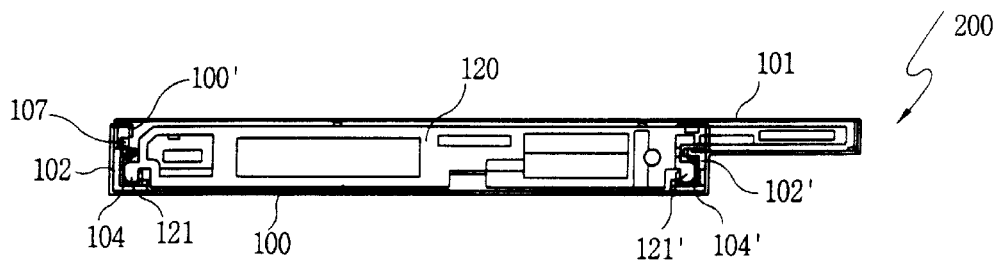
FIG. 6 is a front-cross sectional view of the recording medium ejecting apparatus in accordance with the present invention.

The recording medium ejecting apparatus includes, as shown in FIGS. 5 and 6, a lower chassis 100 and an upper chassis 101 which are joined together to form an outer casing, and a disk is driven (operation of recording and reproducing) between the lower chassis 100 and the upper chassis 101.

The recording medium ejecting apparatus generally includes a drive main body, a tray and a movable bridge that are typically defined by the combination of the lower chassis 100 and the upper chassis 101.

The disk drive 200 has a structure that a tray 120 is slidably installed at an upper surface of the lower chassis 100 so as to be movable inwardly and outwardly to and from the disk drive 200.

Figure 7:
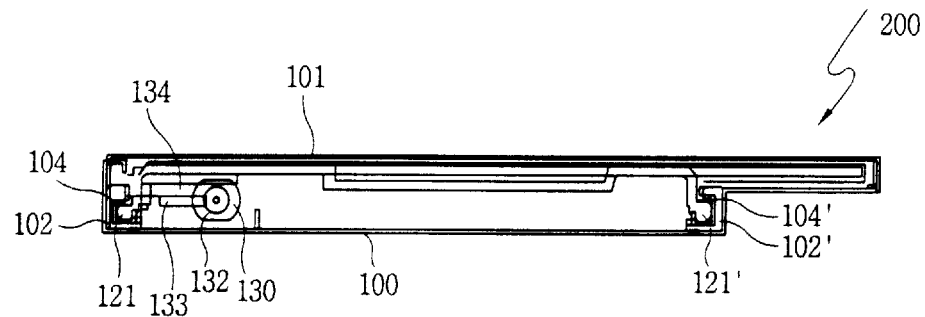
FIG. 7 is a rear-cross sectional view of the recording medium ejecting apparatus in accordance with the present invention.
Figure 8:
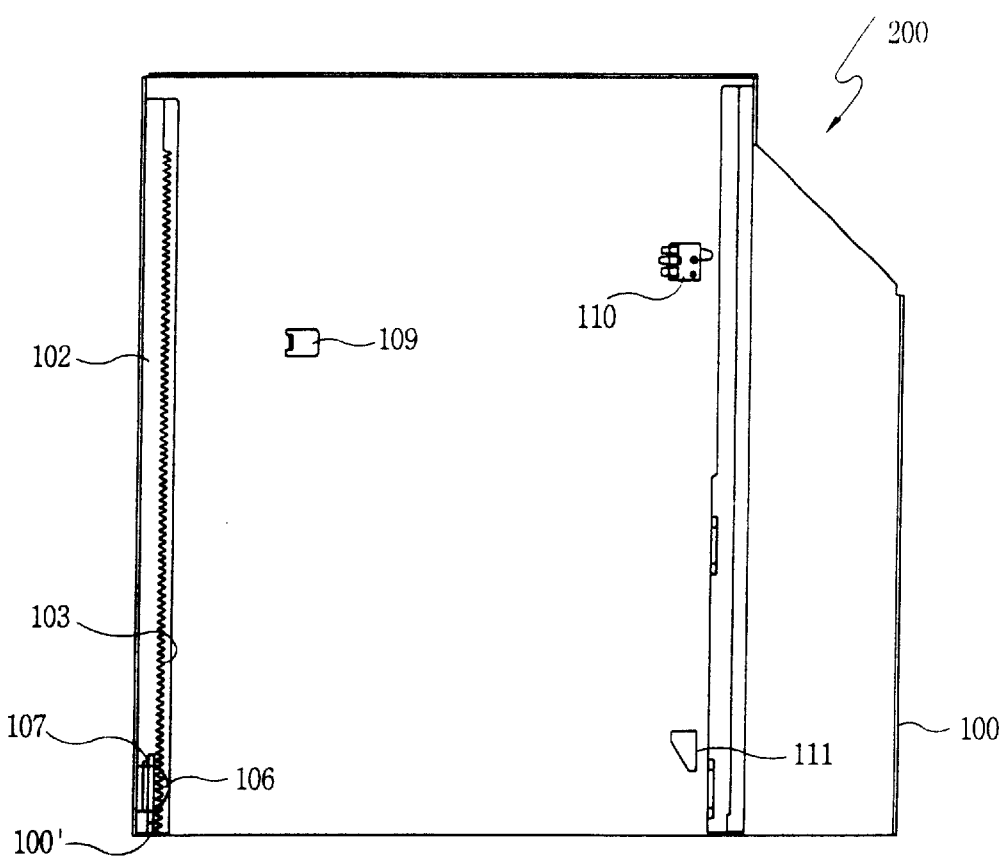
FIG. 8 is a plan view of a lower chassis of the recording medium ejecting apparatus in accordance with the present invention.

That is, as shown in FIGS. 6 to 8, guide rails 102 and 102' for guiding the tray 120 are formed along the length of both sides of the lower chassis 100. A rack gear 103 is provided extending lengthwise over most of the guide rail 102.

Figure 9:
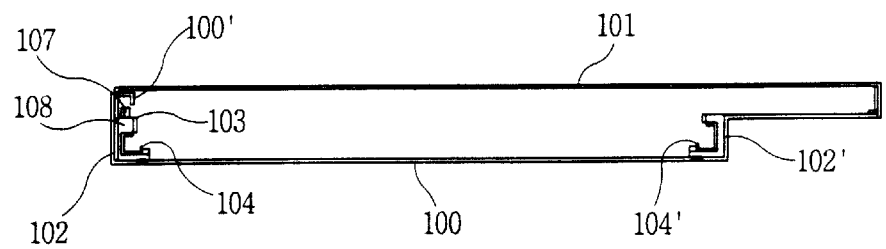
FIG. 9 is a front view of the lower chassis of FIG. 8.
Figure 18A:
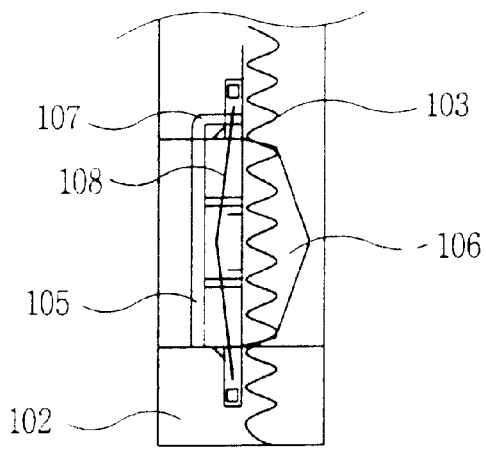
FIG. 18A is a partial plan view showing a state that a movement prevention plate and an interference prevention protrusion are not operated in the recording medium ejecting apparatus in accordance with the present invention.
Figure 18B:
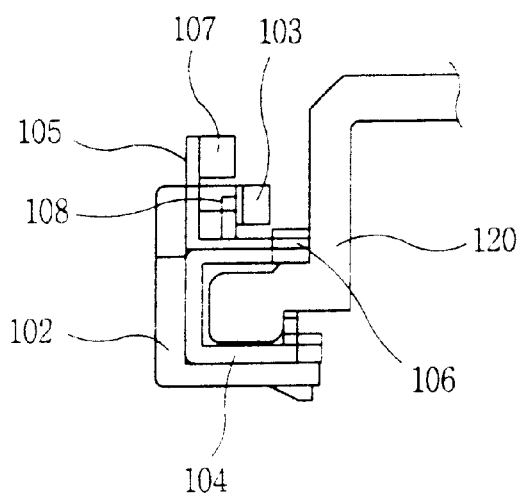
FIG. 18B is a partial front view showing a state that a movement prevention plate and an interference prevention protrusion are not operated in the recording medium ejecting apparatus in accordance with the present invention.

As shown in FIGS. 9 and 18B, inside the guide rails 102, 102', support rails 104 and 104' are respectively provided bent from the lower sides of the guide rails 102, 102'.

Sliding legs 121 and 121' movably disposed respectively inside the support rails 104 and 104' are formed along the lengths of the respective side edges of the tray 120.

Since the support rails 104 and 104' are slidably installed at a predetermined interval inside the guide rails 102, 102', even when the tray 120 is ejected outwardly from the drive 200, the support rails 104 and 104' can guide the movement of the tray without separating the tray 120 from the guide rails 102, 102'.

As shown in FIG. 5, a movement prevention plate 105 is installed at a front end portion of the guide rail 102 having the rack gear 103.

As shown in FIGS. 18A through 19B, the movement prevention plate 105 is provided with an operative portion 106 protruding inwardly of the drive 200, which is selectively operative with the tray 120.

A support plate 107 is formed bent inwardly toward the drive 200 at a rear end portion of the movement prevention plate 105. A stopper 100' is formed bent at a front end portion of the outside of the guide rail 102.

The support plate 107 and the stopper 100' are provided to prevent a movable bridge 140 (to be described later) from ejecting excessively beyond a predetermined distance outwardly from the drive 200.

The construction of the tray will now be described with reference to FIGS. 10 and 11.

A turntable upon which a disk is mountable to be rotated is installed at the center of the upper surface of the tray.

The turntable 122 is typically driven by a spindle motor (not shown). A damper 8 for clamping the disk so as to prevent it from releasing is formed at the upper surface of the turntable.

At one side of the turntable 122, there is provided an optical pick-up 124 for recording a signal onto the disk or reproducing a recorded signal therefrom, and a lead screw (not shown) rotated by a sled motor (not shown) so as to move the optical pick-up 124 in a radial direction of the disk.

Other elements normally required for driving the optical pick-up 124 are installed at the bottom surface of the tray 120.

An eject lever 125 is formed at a lower surface of the other end portion of the front side of the tray 120, which is selectively engaged with a tray engaging plate 111 installed at the upper surface of the lower chassis 100, so that the tray 120 may not be arbitrarily ejected from the drive 200.

As shown in FIG. 8, an elastic support 109 is provided at a predetermined portion of the upper central surface of the lower chassis 100. An elastic support lever 126 is installed at the lower surface of the tray 120, at a position corresponding to the elastic support 109. A tension spring 127 is provided at one side of the elastic support lever 126 to be connected to the elastic support lever 126.

The elastic support lever 126 is supportedly contacted with the elastic support 109 when the tray is inserted into the drive 200, so that the tray may be elastically urged toward the front side of the drive 200 by the tension spring 127.

A loading motor 130 is installed at a rear side of the elastic support lever 126 on the lower surface of the tray 120.

A worm gear 132 is engaged with a rotational shaft 130' of the loading motor 130, and a worm wheel 133 operative according to the movement of the worm gear 132 is engaged with the outside of the worm gear 132.

A driving gear 134 is engaged between the worm wheel 133 and the rack gear 103, so as to be driven and operated by the worm wheel 133 as being engaged therewith.

The driving gear 134 is formed thicker than the rack gear 103, so that it can be engaged with a movable rack gear 141 (to be described later) of the movable bridge 140 (to be described later).

That is, a lower portion of an outer periphery of the driving gear 134 is engaged with the rack gear 103, while the upper portion of the outer periphery thereof is engaged with the movable rack gear 141.

Figure 10:
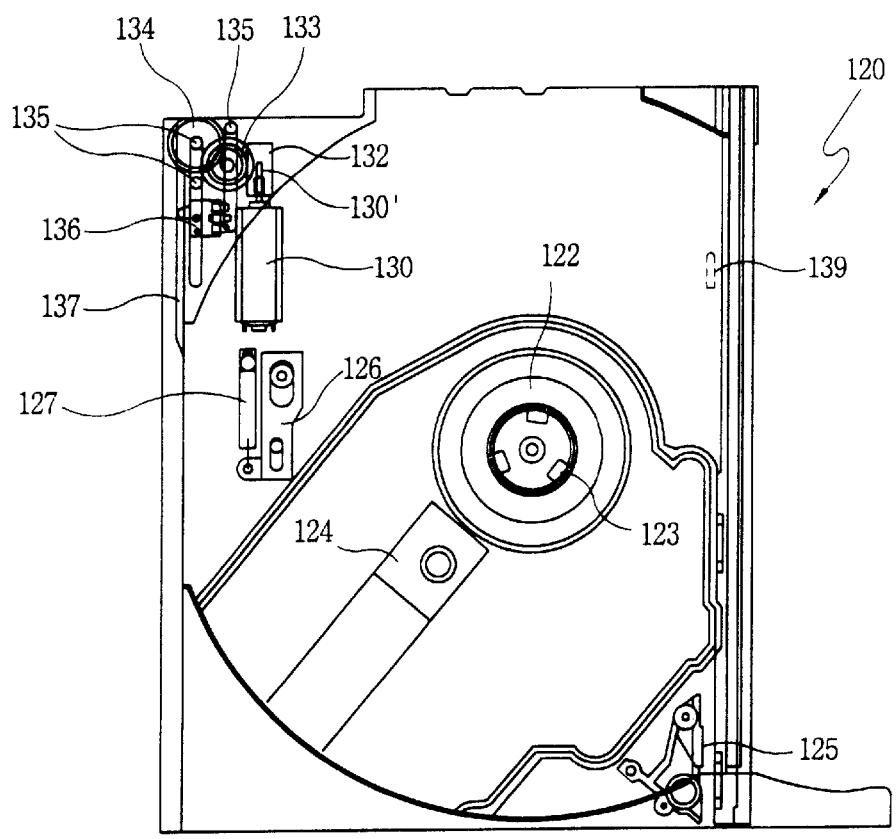
FIG. 10 is a plan view of a tray of the recording medium ejecting apparatus in accordance with the present invention.
Figure 11:
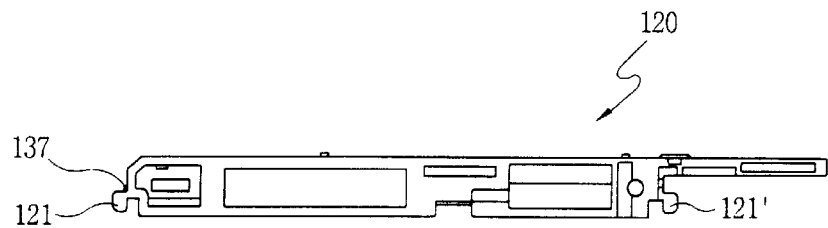
FIG. 11 is a front view of the tray of FIG. 10.
Figure 12:
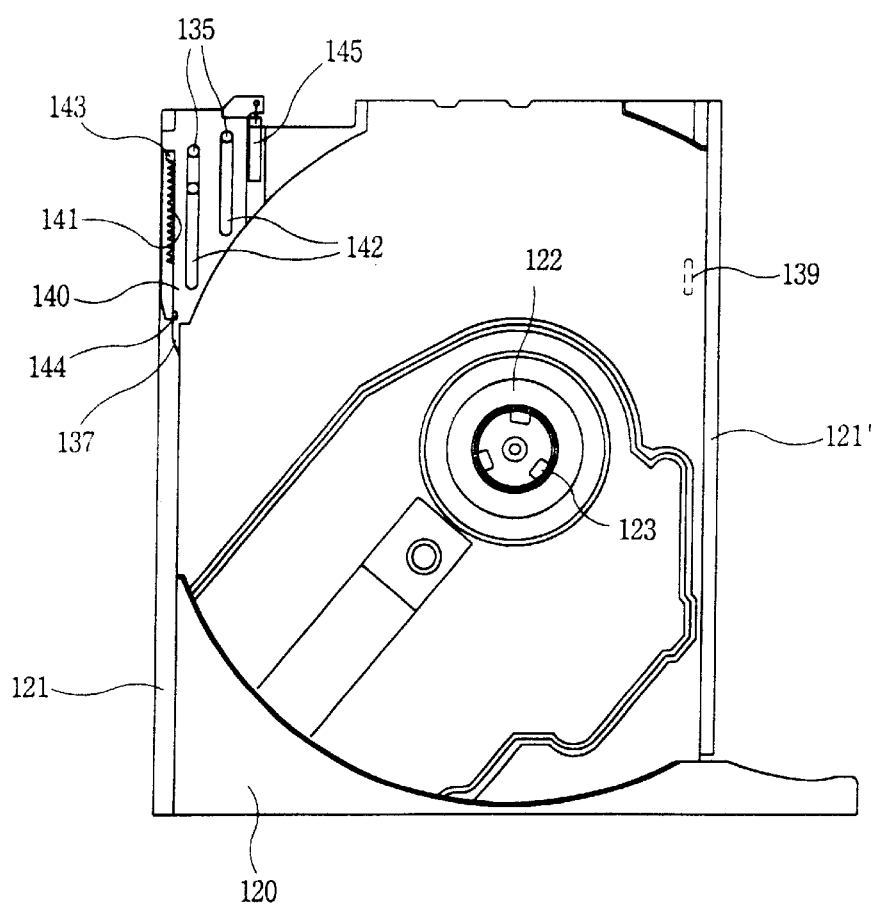
FIG. 12 is a plan view showing a state that a movable bridge is installed at the tray in the recording medium ejecting apparatus in accordance with the present invention.

As shown in FIGS. 10 and 12, a plurality of upwardly protruding guide ribs 135 are formed the tray 120.

The guide ribs 135 guide the movement of the movable bridge 140 (to be described later).

As shown in FIG. 10, an interference prevention protrusion 137 for selectively pressing the movement prevention plate 105 is formed at a side of the tray 120 inserted into the guide rail 102.

The interference prevention protrusion 137 is provided only at a predetermined portion of the rear side of the tray 120. The front side and the rear side of the protrusion 137 are formed slanted so as to be easily contacted with the operative portion 106 of the movement prevention plate 105.

An ejection detection sensor 136 for detecting whether the tray 120 is ejected outwardly from the drive 200 is provided at one rear side of the upper surface of the tray 120. The ejection detection sensor 136 is turned on and off by an ON/OFF detection protrusion of the movable bridge 140 (to be described later).

Meanwhile, as shown in FIG. 8, an insertion detection sensor 110 for detecting whether the tray 120 is inserted into drive 200 is provided at the upper surface of the other side of the lower chassis 100, and as shown in FIG. 10, an insertion detection protrusion 139 is formed at a bottom surface of the tray 120, at a position corresponding to the insertion detection sensor 110, by which the insertion detection sensor 110 detects whether the tray 120 has been inserted into the drive 200.

The construction of the movable bridge 140 will now be explained.

FIG. 12 shows the combination of the movable bridge 140 with the tray 120.

A movable rack gear 141 having the same shape as the rack gear 103 of the guide rail 102 is provided at one side of the movable bridge 140, for completely moving the tray 120 inwardly and outwardly to and from the drive 200 under the driving force of the loading motor 130.

The movable bridge 140 provided at the upper surface of the tray 120 is elastically supported by a first elastic member 145.

The first elastic member 145 serves to enable the driving gear 134 to be engaged with the movable rack gear 141 after the driving gear 134 is released from the rack gear 105 while the driving gear 134 is engaged with the rack gear 105 to be operated and the tray 120 is ejected, and also serves to enable the movable rack gear 141 to return to its original position on the tray 120 when the tray 120 is inserted into the drive 200.

A plurality of guide slots 142 in which the guide ribs 135 of the tray 120 are insertedly guided are formed in the movable bridge 140 in a longitudinal moving direction of the tray 120.

The guide slots 142 prevent the movable bridge 140 from drifting right and left when the movable bridge 140 is fixed at the tray 120.

A protrusion 143 is formed at a rear end portion of the movable bridge 140, that is, at the end portion of the movable rack gear 141.

The protrusion 143 is engaged with the stopper 100' when the tray 120 moves, so that the movable bridge 140 may not be excessively moved outwardly beyond a suitable extent from the drive 200.

An ejection detection protrusion 144 for turning on and off the ejection detection sensor 136 is formed at a front end portion of the movable bridge 140.

The operation of the recording medium ejecting apparatus constructed as described above will now be explained with reference to FIGS. 13 through 19B.

FIG. 5 shows a state that the tray 120 is inserted inside the drive 200.

In this state, since the eject lever 125 installed at the lower surface of the tray 120 is engaged with the tray engaging plate 111, the tray 120 won't be ejected outwardly from the drive 200. Normally in this state, the reproducing and recording is performed on the disk.

At this time, the elastic support lever 126 is supported at the elastic support 109, and thus, the tension spring 127 connected to the elastic support lever 126 is elongated, having the elasticity.

Accordingly, the tray 120 is urged to be ejected outwardly by the tension spring 127, but, as explained above, since the eject lever 125 is engaged with the tray engaging plate 111, the tray won't arbitrarily be ejected outwardly.

Figure 13:
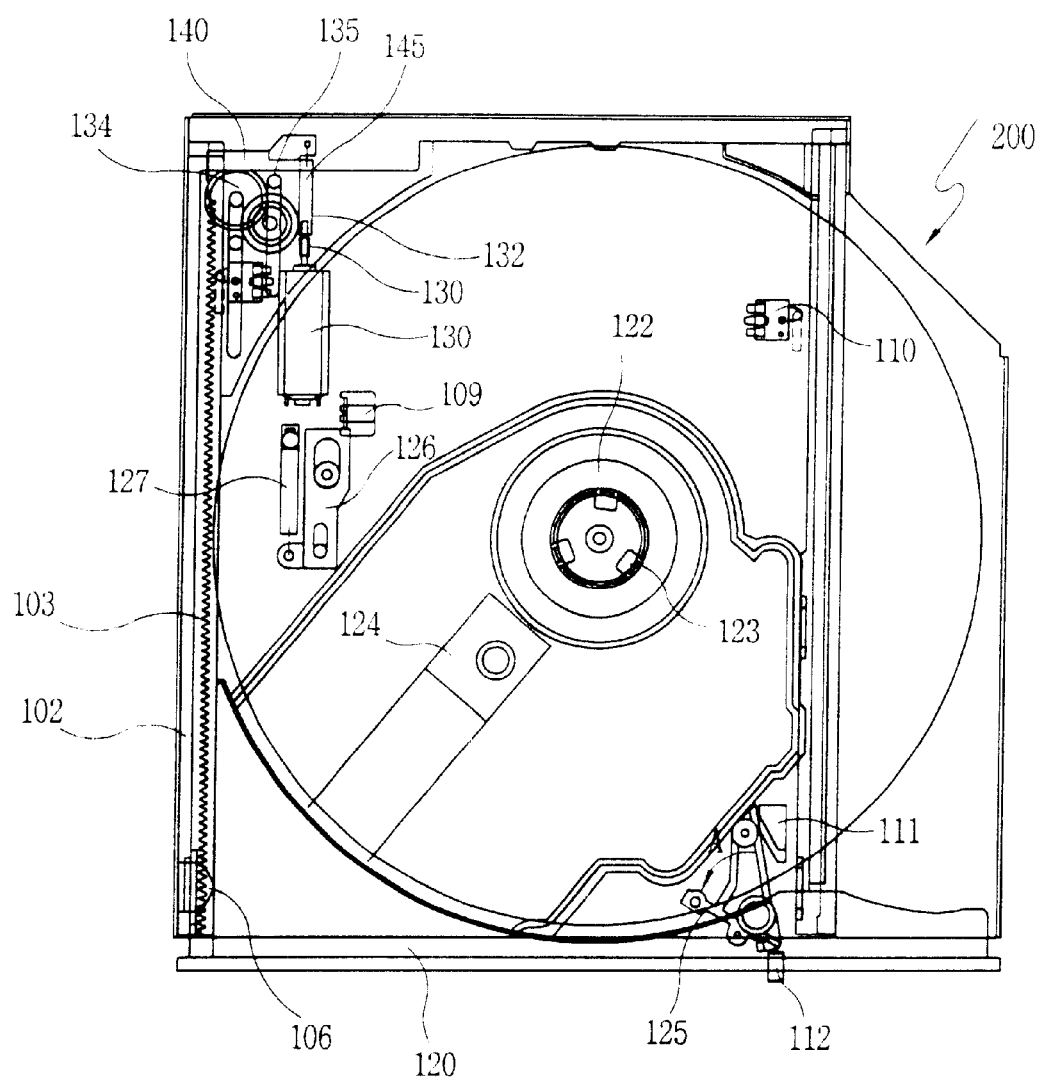
FIG. 13 is a plan view showing a state that the tray is ejected from the drive by a restoring force of a tension spring in the recording medium ejecting apparatus in accordance with the present invention.

In this state, when the eject button 112 at the front side of the tray 120 is pressed by a user, as shown in FIG. 13, the eject lever 125 is rotated in the direction of the arrow 'A', according to which the eject lever 125 is released from the tray engaging plate 111.

When the eject lever 125 is rotated, as shown in FIG. 13, the tray 120 is slightly ejected outwardly from the drive 200 by only a slight distance due to the restoring force of the tension spring 127.

As the tray 120 is ejected, the insertion detection protrusion 139 is released from the insertion detection sensor 110, by which the loading motor 130 starts operating.

When the loading motor 130 starts operating, the driving force of the loading motor 130 is transmitted to the worm gear 132, the worm wheel 133, and to the driving gear 134, each being engaged therewith, according to which the driving gear 134 moves along the rack gear 103.

Figure 14:
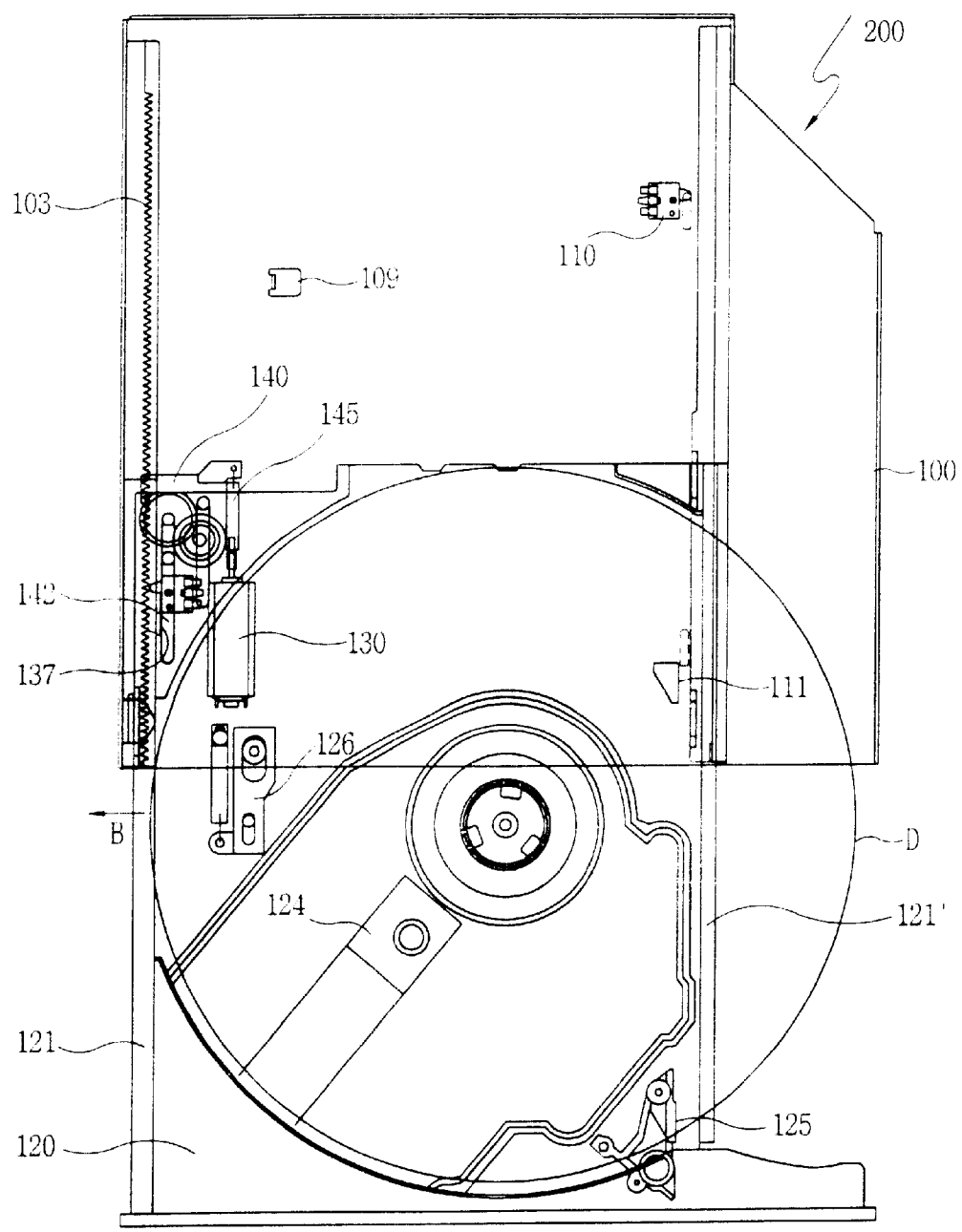
FIG. 14 is a plan view showing a state that the tray is ejected as a driving gear engaged with a rack gear moves according to the operation of the recording medium ejecting apparatus in accordance with the present invention.

Accordingly, as shown in FIG. 14, the tray 120 moves outwardly from the drive 200 along the guide rails 102, 102'.

At this time, as shown in FIGS. 18A and 18B, the movement prevention plate 105 is in a state of having moved into the drive 200 due to the elasticity of the second elastic member 108.

Figure 19A:
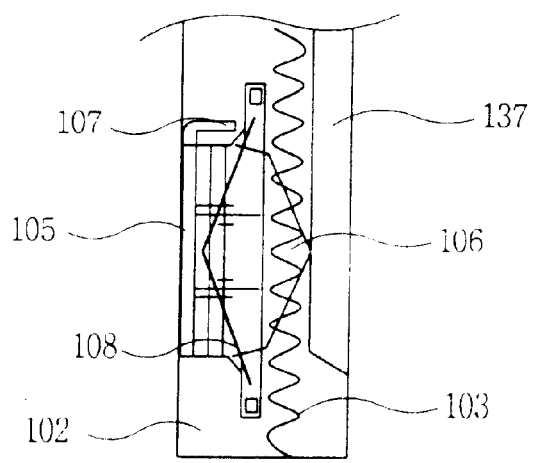
FIG. 19A is a partial plan view showing a state that a movement prevention plate and an interference prevention protrusion are operated in the recording medium ejecting apparatus in accordance with the present invention.
Figure 19B:
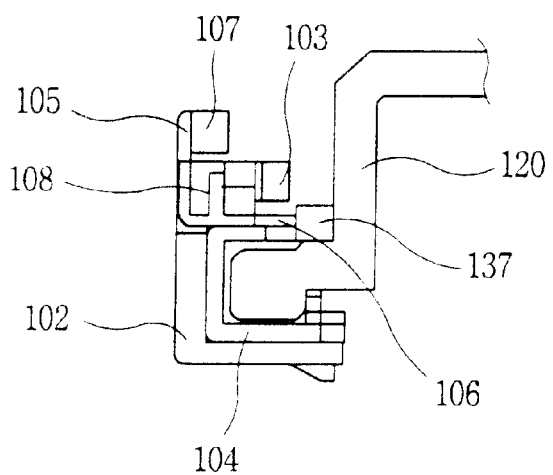
FIG. 19B is a partial front view showing a state that a movement prevention plate and an interference prevention protrusion are operated in the recording medium ejecting apparatus in accordance with the present invention.

While the tray 200 is being moved, when the interference prevention protrusion 137 formed at a side of the tray 120 is contacted with the operative portion 106 of the movement prevention plate 105, as shown in FIGS. 19A and 19B, the movement prevention plate 105 moves in the direction of the arrow 'B' in FIG. 14, so that it may not prevent the tray 120 from moving, more specifically, to allow the movement of the movable bridge 140.

When the movement prevention plate 105 is in the state of having moved in the 'B' direction, it is urged by the elasticity of the second elastic member, and thus, the movement prevention plate 105 is forced to return to its original position, and this state is maintained until the interference prevention protrusion 137 is contacted with the operative portion 106 and the tray 120 is accordingly moved.

Figure 15:
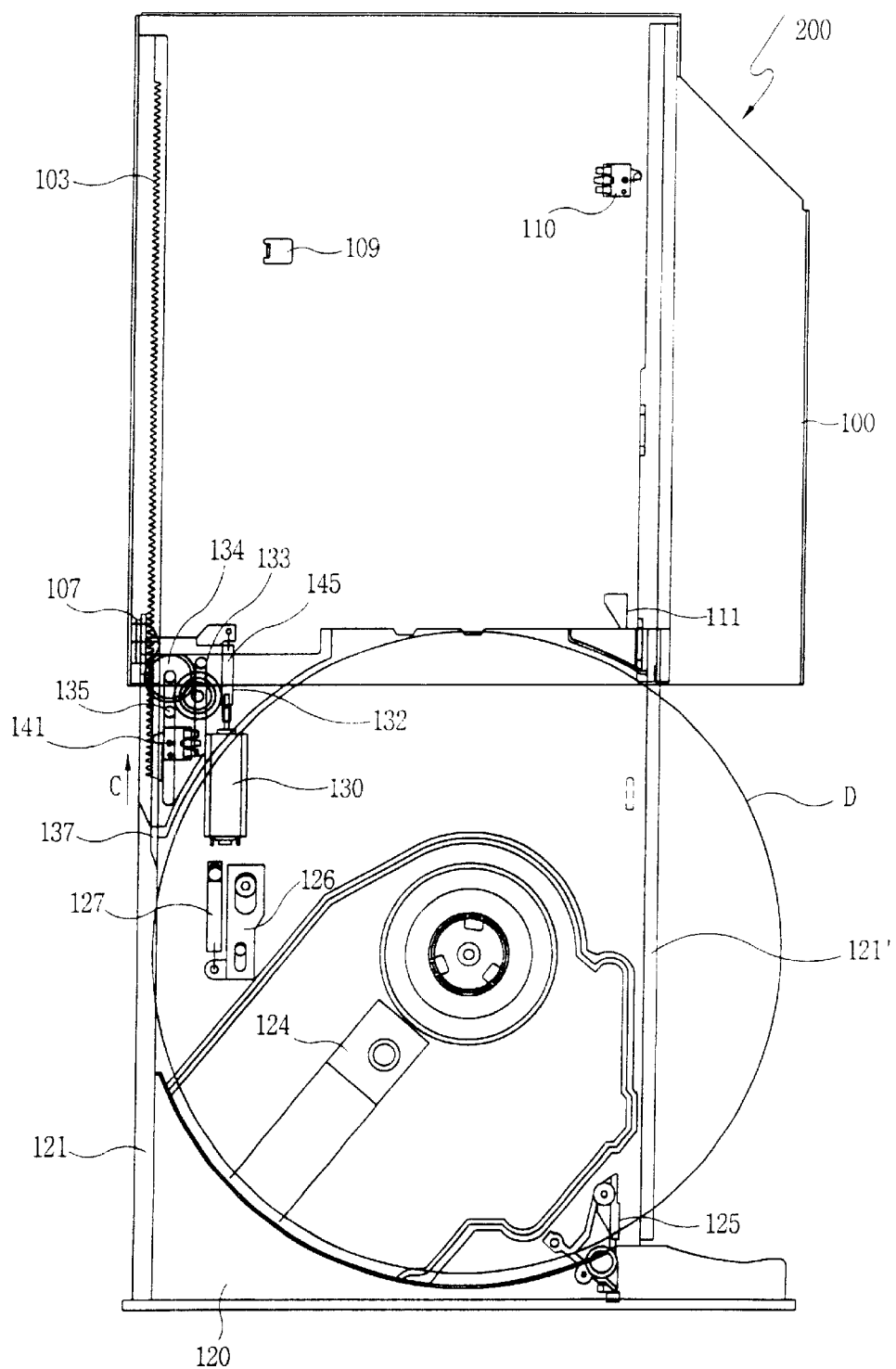
FIG. 15 is a plan view showing a state that the tray is ejected as the driving gear engaged with a movable rack gear moves in the recording medium ejecting apparatus in accordance with the present invention.

While the tray 120 is being ejected, when it reaches the state shown in FIG. 15, the protrusion 143 of the movable bridge 140 is engaged with the stopper 100' formed at one side of the front portion of the lower chassis 100. Then, the tray 120 keeps moving, while the movable bridge 140 does not move any longer together with the tray 120.

Accordingly, by this time, the driving gear 135 has moved as being engaged with the rack gear 103, signifying a state that the driving gear 135 reaches the end portion of the front side of the rack gear 103 and it is not engaged with the movable rack gear 141. In this state, as the protrusion 143 of the movable bridge 140 is engaged with the stopper 100', the movable bridge 140 is stopped and the tray 120 is ejected a bit more while the first elastic member 145 elastically supporting the movable bridge 140 is elongated, so that the driving gear 134 is released from the rack gear 134 so as to be engaged with the movable rack gear 141 of the movable bridge 140.

Likewise, at the instant when the driving gear 134 is engaged with the movable rack gear 141 to be driven, a force works enabling the movable rack gear 141 to move in the direction of the arrow 'C' as shown in FIG. 15, due to the elasticity of the first elastic member 145.

However, simultaneously, the operative portion 106 of the movement prevention plate 105 is released from the interference prevention protrusion 137, according to which the movement prevention plate 105 moves to its original position (in the opposite direction to the arrow 'B' in FIG. 14) due to the restoring force of the second elastic member 108.

Accordingly, the support plate 107 moves in the opposite direction to the arrow 'B' in FIG. 14 together with the movement prevention plate 105, to thereby be positioned on a movement locus of the movable bridge 140 (refer to the position shown in FIG. 18A).

That is, the support plate 107 is positioned at a rear side of the movable bridge 140 and the end portion of the rear side of the movable bridge 140 is supported by the support plate 107 of the movement prevention plate 105.

Figure 16:
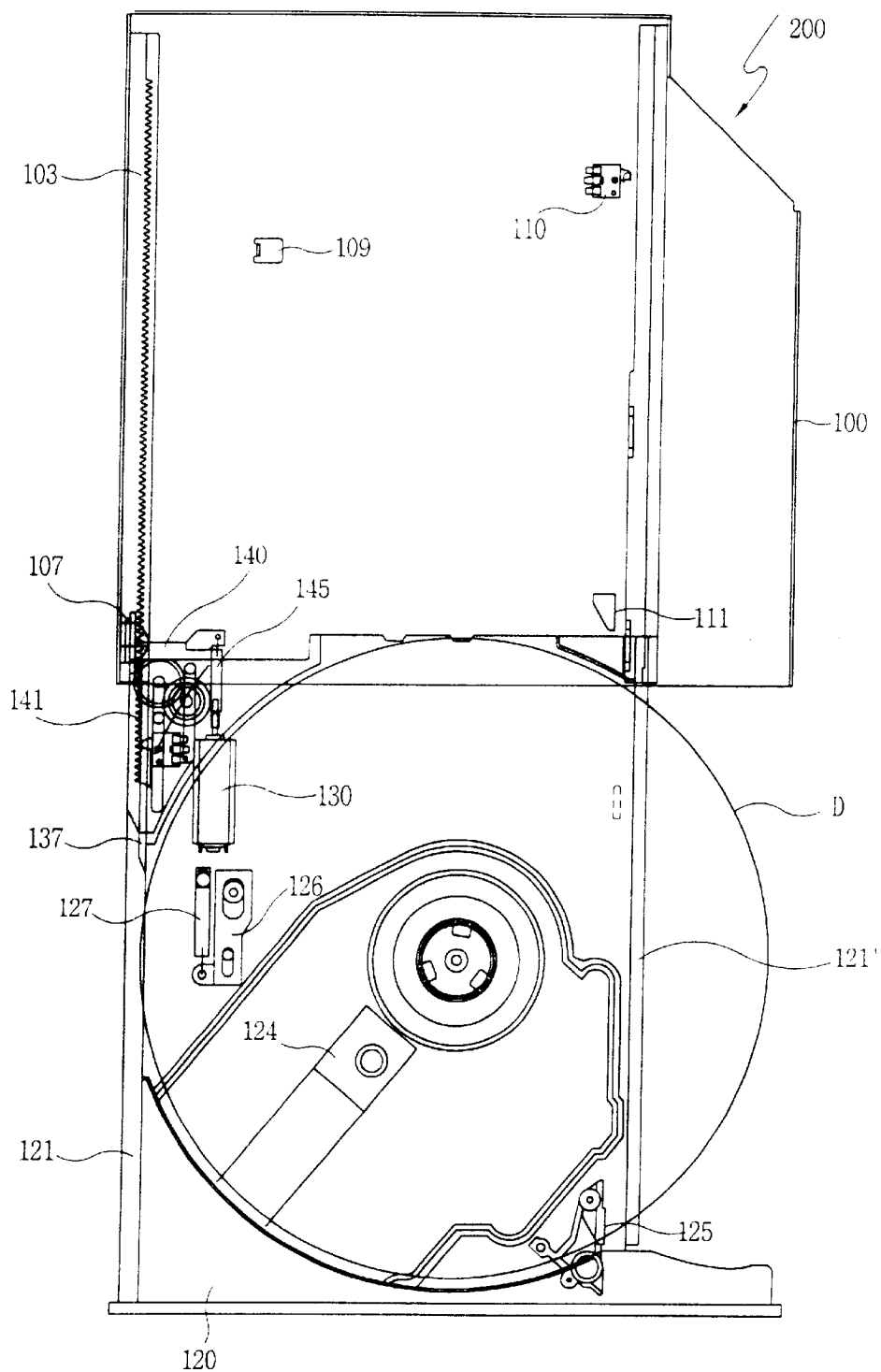
FIG. 16 is a plan view showing a state that only the tray keeps moving while the movable bridge is fixed in the recording medium ejecting apparatus in accordance with the present invention.

Consequently, as shown in FIG. 16, the movable bridge 140 is fixed while only the tray 120 relatively keeps moving.

Figure 17:
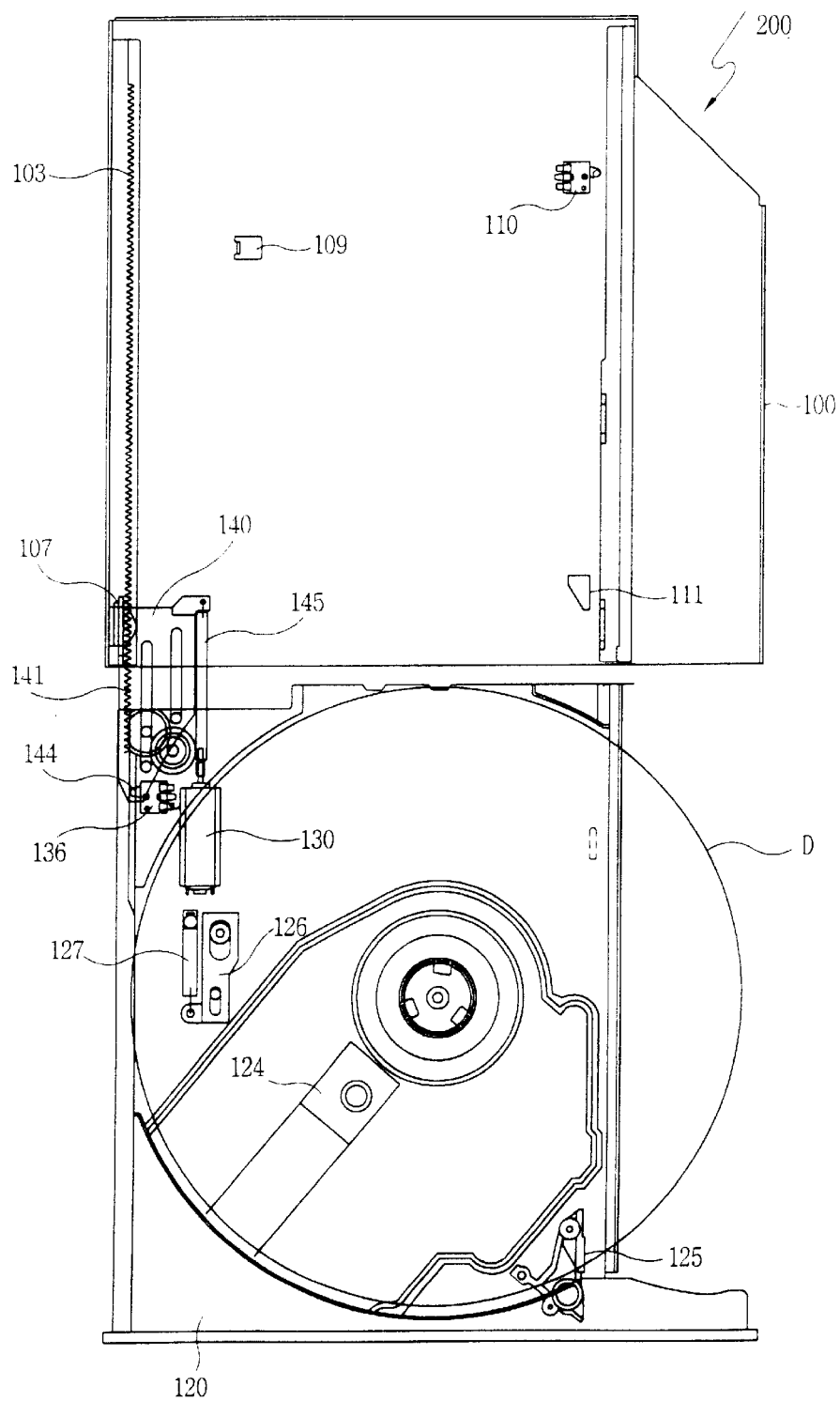
FIG. 17 is a plan view showing a state that the recording medium ejecting apparatus is driven and the tray is completely ejected outwardly from the drive in accordance with the present invention.

In this state, as the loading motor 130 is kept driving, as shown in FIG. 17, the tray 120 is completely ejected outwardly to the position where the disk can be inserted or removed.

When the tray 120 is completely ejected from the drive 200, the ejection detection sensor 136 installed at the lower surface of the tray 120 is turned on by the ejection detection protrusion 144, which stops the operation of the loading motor, thereby completing ejection of the tray 120.

Inserting of the tray 120 into the drive 200 is done in the reverse order to the above described process, and thus, description thereof is omitted.(That is, when the tray is in the fully ejected position and a user presses the tray inwardly toward the drive until the ejection detection protrusion 144 no longer turns on the ejection detection sensor 136, the loading motor is operated . . . . )

As so far described, according to the recording medium ejecting apparatus of the present invention, since the movement of the tray for loading and unloading the recording medium, such as a disk, is performed automatically, acquiring a readiness in operating and a convenience for users' sake.

In addition, the apparatus can be constructed in a small size, almost the same size as the disk, and is slim enough in overall size so as to be used for a notebook computer.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A recording medium ejecting apparatus for optical disc drive comprising:

a drive main body;

a tray for carrying a recording medium thereon and movable inwardly and outwardly of the drive main body; and a driving means for movement of the tray, even in a state that the tray is completely ejected from the drive main body, wherein the driving means includes a loading motor installed at the tray;

an internal movement means for moving the tray inside the drive main body under power of the loading motor; and an external movement means for moving the tray outside the drive main body under the power of he loading motor.

2. An apparatus according to claim 1, wherein a longest length of one side of the tray is substantially the same as an outer diameter of the recording medium.

3. The apparatus according to claim 1, wherein the internal movement means includes:

a rack gear formed at one side of a guide rail of a lower chassis of the drive main body;

a worm gear operatively engaged with the loading motor;

a worm wheel operatively engaged with the worm gear; and a driving gear engaged between the worm wheel and the rack gear and being operated by the worm wheel.

4. The apparatus according to claim 1, wherein the external movement means includes;

a power transmission means for transmitting the power of the loading motor;

a movable bridge being accordingly moved with the tray as the tray moves inside the drive main body, and enabling the tray to move outside the drive main body upon receipt of the power from the loading motor while being relatively fixed to the tray in a state that the tray is completely ejected from the drive main body.

5. The apparatus according to claim 4, wherein the power transmission means is a driving gear operatively engaged with the rack gear formed at one side of the guide rail.

6. The apparatus according to claim 4, wherein the movable bridge includes:

a movable rack gear formed at one side thereof;

a plurality of guide slots in which guide ribs of the tray are insertedly guided;

a protrusion formed at one end portion of the movable rack gear; and a first elastic member elastically combined with the tray.

7. The apparatus according to claim 1, wherein the power of the loading motor is transferred from the internal movement means to the external movement means at the instant that the tray is completely ejected.

8. The apparatus according to claim 7, further includes a movable bridge support means for smoothly moving the tray by means of the driving force of the loading motor when the power of the loading motor is transferred to the external movement means.

9. The apparatus according to claim 8, wherein the movable bridge support means includes:

a movement prevention plate installed at the guide rail of the lower chassis of the drive main body;

an operative portion protrusively formed at the movement prevention plate for being selectively operative with the tray;

a support plate formed bent at the movement prevention plate;

an interference prevention protrusion formed at a side of the tray for selectively pressing the movement prevention plate; and a stopper formed at the guide rail.

10. The apparatus according to claim 1, further including an ejection detection means for detecting whether the tray is completely ejected, having an ejection detection sensor installed at one side of a lower surface of the tray and an ejection detection protrusion formed at a movable bridge that is relatively fixed over the tray being moved in a state that the tray is completely ejected from the drive main body.

11. A recording medium ejection apparatus for optical disc drive comprising:

a driving means, for supplying a driving force enabling a tray to be inserted in a state that the tray is completely ejected from a drive main body, being positioned between the drive main body and the tray, wherein the driving means includes a loading motor installed at the tray;

an internal movement means for moving the tray inside the drive main body under power of the loading motor; and an external movement means for moving the tray outside the drive main body under the power of the loading motor.

* * * * *